(12) United States Patent
Larsen

(10) Patent No.: US 8,097,355 B2
(45) Date of Patent: Jan. 17, 2012

(54) PROTECTING AGAINST INCORRECT BATTERY POLARITY

(75) Inventor: Glen C Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 11/941,237

(22) Filed: Nov. 16, 2007

(65) Prior Publication Data

US 2009/0130493 A1 May 21, 2009

(51) Int. Cl.
*H01M 10/38* (2006.01)
(52) U.S. Cl. .......... 429/123; 429/65; 429/100; 429/130; 429/161; 429/186; 429/246
(58) Field of Classification Search .................... 429/65, 429/100, 121, 123, 130, 161, 186, 246
See application file for complete search history.

(56) References Cited

U.S. PATENT DOCUMENTS

| | | | |
|---|---|---|---|
| 4,084,037 A | 4/1978 | Morton | |
| 4,595,641 A | 6/1986 | Giurtino | |
| 4,623,206 A | 11/1986 | Fuller | |
| 4,991,225 A | 2/1991 | Holcomb et al. | |
| 5,229,220 A | 7/1993 | Stanton et al. | |
| 5,431,575 A * | 7/1995 | Engira | 439/218 |
| 5,473,242 A | 12/1995 | McKenna | |
| 6,291,970 B1 | 9/2001 | Miller et al. | |
| 7,170,006 B1 | 1/2007 | Burrell et al. | |
| 2007/0275299 A1* | 11/2007 | Larsen | 429/100 |

FOREIGN PATENT DOCUMENTS

| | | |
|---|---|---|
| JP | 9306456 A | 11/1997 |
| JP | 10134786 A | 5/1998 |
| JP | 2003331808 A | 11/2003 |

OTHER PUBLICATIONS

ISA Korea, International Search Report of PCT/US2008/081486, Mar. 17, 2009, 3 pages.
"Waterproof Battery Charger Features Reverse Polarity Protection", 2006, Thomas Publishing Company, pp. 1-3.
"Battery Contact Design Criteria", 2005 Procter & Gamble, pp. 1-22.
"Lithium Ion Battery Charging Unit", retrieved at <<http://seniordesign.engr.uidaho.edu/2004__2005/mekelektroniks/Solid%20Model%20of%>>, pp. 1-3.
Gedeon., "Cantilever Beams—Part 1", vol. 3, No. 2, Feb. 2001, Brush Wellman Inc., pp. 2.

(Continued)

*Primary Examiner* — Patrick Ryan
*Assistant Examiner* — Ben Lewis
(74) *Attorney, Agent, or Firm* — Alleman Hall McCoy Russell & Tuttle LLP

(57) ABSTRACT

Embodiments of battery holders with dual-contact assemblies are disclosed. One embodiment comprises a battery holder with a substrate and a spring dual-contact assembly, wherein the spring dual-contact assembly comprises a positive contact configured to contact a positive terminal of a battery positioned in the battery holder with the positive terminal oriented toward the spring dual-contact assembly and a negative contact configured to contact a negative terminal of a battery positioned in the battery holder with the negative terminal oriented toward the spring dual-contact assembly. The positive and negative contacts are coupled to an insulator configured to hold the positive contact and negative contact in a fixed relation to one another. Further, one or more cantilever wire springs hold the negative contact, positive contact and insulator in a resiliently displaceable relationship to the substrate.

13 Claims, 10 Drawing Sheets

OTHER PUBLICATIONS

U.S. Appl. No. 11/439,562, filed May 23, 2006 Inventor(s) Glen C. Larsen, entitled "Eliminating Incorrect Battery Installation".

U.S. Appl. No. 11/796,265, filed Apr. 27, 2007 Inventor(s) Glen C. Larsen, entitled "Polarity protection for multiple batteries".

* cited by examiner

PROTECTING AGAINST INCORRECT BATTERY POLARITY

BACKGROUND

Devices powered by replaceable or rechargeable batteries generally include one or more battery holders configured to hold the batteries and make electrical contact with the batteries. In such devices, proper installation of the batteries is commonly achieved through the use of written or graphical directions that indicate the proper battery orientation for correct electrical polarity. Users often follow such instructions correctly, but at times the graphics may be difficult to see as they may have been molded directly into or as part of the product housings, or the directions may have been printed on small or difficult-to-read labels. As a result, users occasionally may incorrectly install batteries with reversed electrical polarity.

Installing batteries with reversed polarity may cause battery problems and product damage. In the best case, the product may simply not work. In worse cases, batteries may overhead and leak, which may cause permanent damage to the electronics, and also may lead to safety problems.

SUMMARY

Various embodiments of battery holders with dual-contact assemblies are described herein. One disclosed embodiment comprises a battery holder with a substrate and a spring dual-contact assembly, wherein the spring dual-contact assembly comprises a positive contact configured to contact a positive terminal of a battery positioned in the battery holder with the positive terminal oriented toward the spring dual-contact assembly and a negative contact configured to contact a negative terminal of a battery positioned in the battery holder with the negative terminal oriented toward the spring dual-contact assembly. The positive and negative contacts are coupled to an insulator configured to hold the positive contact and negative contact in a fixed relation to one another. Further, one or more cantilever wire springs hold the negative contact, positive contact and insulator in a resiliently displaceable relationship to the substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The disclosed embodiments provide battery holders that substantially eliminate the installation a battery with reversed electrical polarity, in that the battery holders allow for a battery to be installed in alternative configurations while, in either configuration, providing proper electrical polarity to the circuitry of a device in which the battery holder is utilized. Further, the disclosed embodiments may be simple to manufacture, and may allow for relatively loose tolerances with regards to parts that are difficult to manufacture with precision. While certain illustrative battery holders are depicted and described herein, it will be understood that the figures and description below are set forth for the purpose of example, and are not intended to be limiting in any manner.

Figure 1:
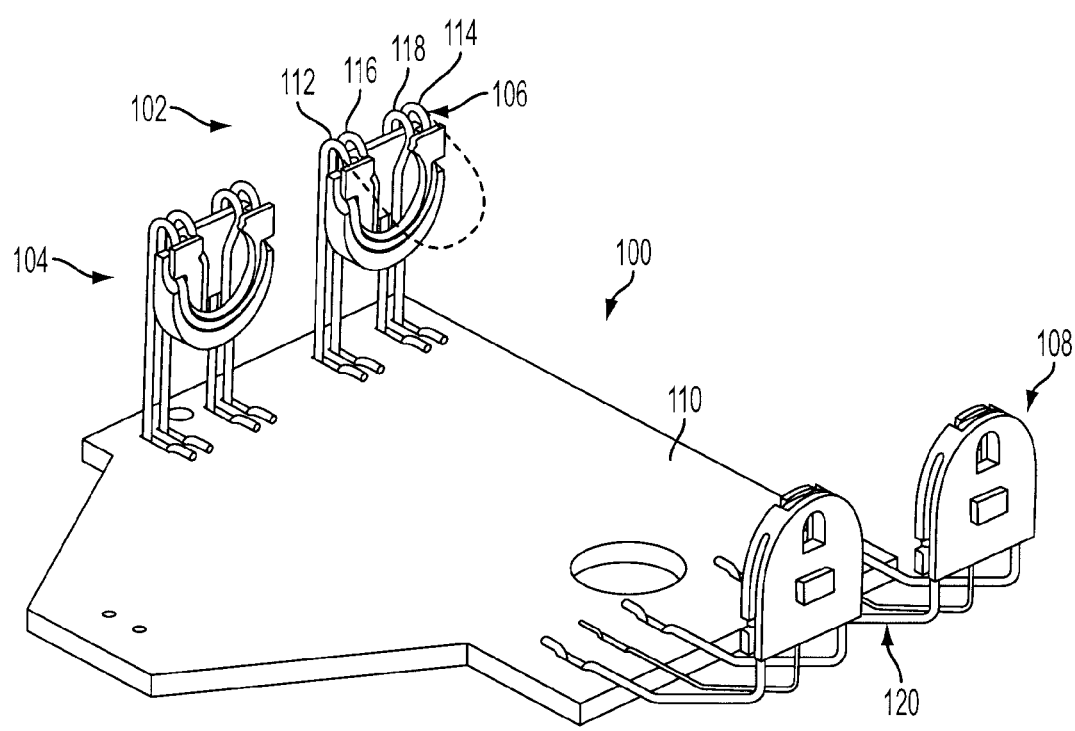
FIG. 1 shows side-by-side dual-contact battery holders according to one embodiment of the present disclosure.
Figure 2:
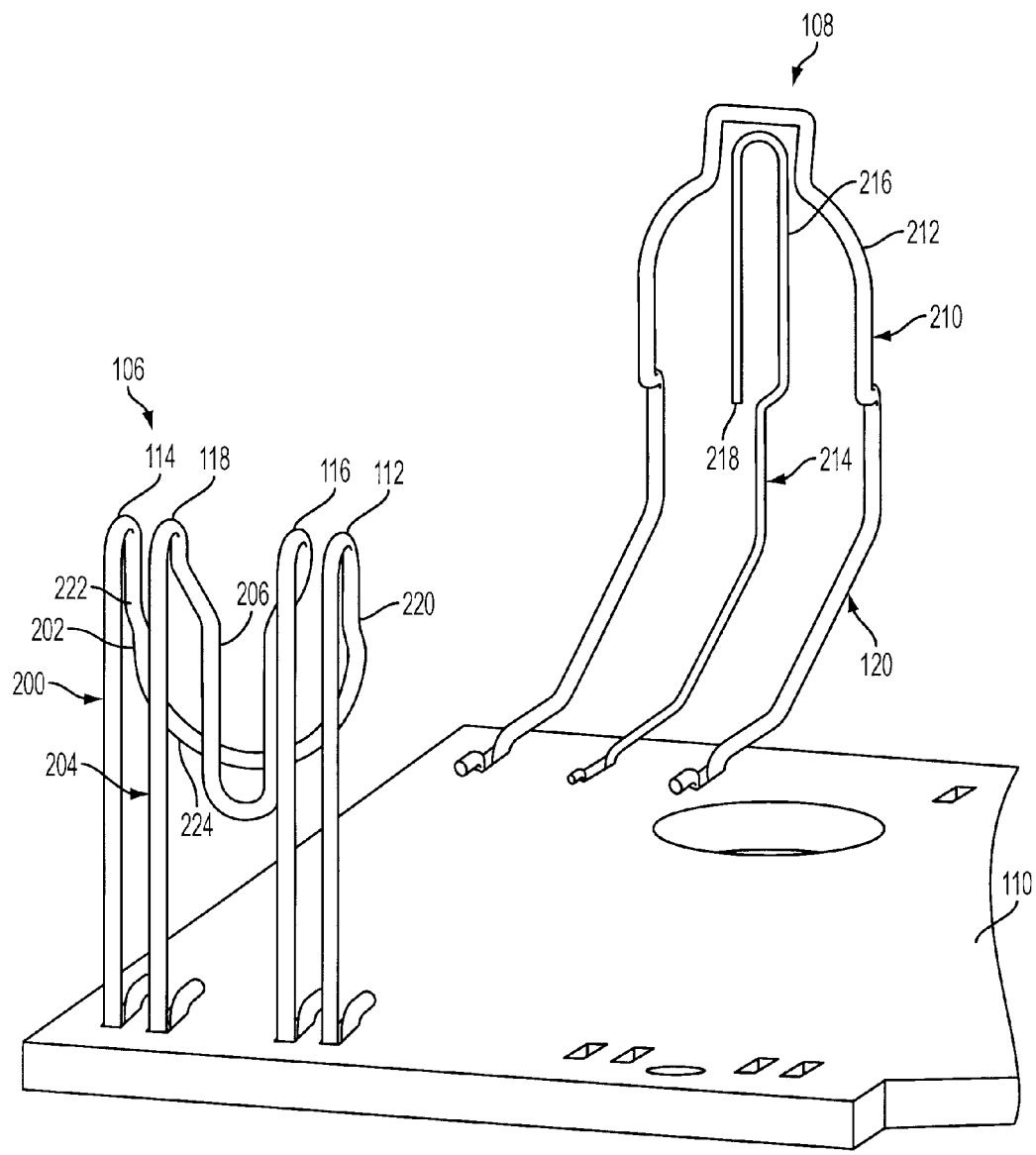
FIG. 2 shows positive and negative contacts of a non-spring dual-contact assembly and a spring dual-contact assembly of the embodiment of FIG. 1.

FIG. 1 shows an embodiment of a multi-battery holder 100 comprising a first battery holder 102 and a second battery holder 104, and FIG. 2 shows a view of the electrically conductive portions of the first battery holder 102. The various structures and features of the battery holders is described below in the context of the first battery holder 102 (which is referred to below as "battery holder 102"), but it will be appreciated that the description also applies to second battery holder 104. The battery holder 102 comprises a spring dual-contact assembly 106 and a non-spring dual-contact assembly 108 mounted to a substrate 110, such as a printed circuit board. A compressed configuration for the spring dual-contact assembly 106 that exists when a battery is positioned in the battery holder 102 is shown in solid lines in FIG. 1, while a relaxed configuration that exists when no battery is positioned in the battery holder 102 is shown by a dashed line.

The spring dual-contact assembly 106 is configured to be resiliently displaceable with respect to the substrate to exert a spring force against a battery positioned in the battery holder 102. Spring force is provided to the spring dual-contact assembly 106 by a plurality of cantilever wire springs 112, 114, 116 and 118. The spring force provided by the cantilever wire springs 112, 114, 116 and 118 against a battery installed in the battery holder 102 helps to ensure that both dual-contact assemblies 106, 108 maintain electrical contact with a battery positioned within the holder. Further, the spring force also helps to prevent a battery from slipping out of the battery holder. The spring force exerted by the cantilever wire springs 112, 114, 116 and 118 may be controlled by selection of the wire gauge, wire material and cantilever angle.

The use of a cantilever wire spring such as those shown at 112, 114, 116 and 118 may offer advantages over other wire spring designs. For example, coil wire springs are commonly used in battery holders to ensure good electrical connections with a battery in the holder and to hold a battery within the holder. With an ordinary single-contact battery contact assembly, the design of such a coil spring may be relatively simple, as space constraints may be relatively loose. For example, a coil spring in an ordinary battery holder may have ¼ inch or more of travel room, allowing a relatively geometrically loose spring design to be used. However, with a dual-contact assembly, the proximity of the positive and negative contacts may permit less room for spring travel, on the order of ⅛ inch or so. The manufacture of a coil spring of sufficient geometric stiffness for such small spaces may be difficult, even where either a very light gauge of wire or a very flexible material is used. In comparison, the manufacture of a cantilever spring, which utilizes a single bend instead of a coil to provide spring force, may allow the spring to be made from any desired wire material or wire gauge, thereby increasing manufacturing options. Further, it also may allow less wire material to be used compared to a coil spring, thereby reducing materials costs. Other features of the spring dual-contact assembly are described in more detail below.

Continuing with FIG. 1, the non-spring dual-contact assembly 108 comprises an elongate, angled wire portion 120 that couples the non-spring dual-contact assembly 108 to the substrate 110. The use of the elongate, angled wire portion 120 allows the substrate 110 to be smaller, and therefore may lower manufacturing costs compared to other configurations that utilize a larger substrate. While the spring dual-contact assembly 106 is shown extending directly upwards (referring to the orientation of the battery holder 102 shown in FIG. 1) from the substrate and the non-spring dual-contact assembly 108 is shown with the elongate, angled wire portion 120, it will be understood that either dual-contact assembly may be coupled to the substrate in either of these manners without departing from the scope of the present disclosure.

FIG. 2 shows the electrically conductive structures of the battery holder 102. In this figure, the insulators that separate the contacts in the spring dual-contact assembly 106 and the non-spring dual-contact assembly 108 are omitted for clarity. First, it can be seen that the spring dual-contact assembly 106 comprises two continuous wires. An outer wire 200 forms a negative contact 202 and cantilever springs 112, 114, while an inner wire 204 forms a positive contact 206 and cantilever springs 116, 118. Therefore, the cantilever springs 112, 114, 116, 118 that provide spring force also conduct electrical current to and from a battery in the holder.

Likewise, it can be seen that the non-spring dual-contact assembly 108 also comprises two wires, wherein an outer wire 210 forms a negative contact 212 and an inner wire 214 forms a positive contact 216. The inner wire 214 of the depicted embodiment does not form a closed "U" shape with the substrate 110 like the other wires, but instead terminates in an open end 218 configured to connect to a complementary structure on the insulator, described below, that holds the positive and negative contacts apart. In other embodiments, the inner wire 214 may have a closed "U" shape wherein the inner wire connects to the substrate 110 on both sides of the contacts.

In the depicted embodiment, the outer wire 210 has a different gauge than the inner wire 214 of the non-spring dual-contact assembly 108. However, in other embodiments, the outer wire 210 and the inner wire 214 of the non-spring dual-contact assembly 108 may have the same gauge. Likewise, the outer wire 200 and inner wire 204 of the spring dual-contact assembly 106 are depicted as having the same gauge, but may have different gauges in other embodiments, depending upon the desired mechanical and electrical characteristics.

In FIG. 2, it can be seen that each of the wires 200, 204, 210 and 214 of the battery holder 102 have bends that are fairly spaced apart, and relatively little bending compared to a coil spring. For example, the outer wire 200 of the spring dual-contact assembly 106 comprises a set of spring bends to form the cantilever springs 112, 114, a set of offsetting wire bends 220, 222 to offset the negative contact 202 from the positive contact so that the contacts are appropriately located to connect only to the intended battery contacts, and a larger radius bend 224 to form the negative contact in such a manner as to contact a negative battery terminal while avoiding contact with a positive battery terminal. The other wires have a similarly small number of bends.

The use of a lesser number of wire bends and/or a lesser degree of bending may make facilitate manufacturing relative to more complex spring designs such as some coil spring designs, and therefore may lower manufacturing costs. Further, as described below, the depicted wires are configured to be connected to an insulator simply by snapping the wires into structures formed on the insulator. This allows manufacturing steps such as heat staking, fastening, bending or crimping the wires around structures on the insulator, etc. to be avoided, and thereby may further help to reduce manufacturing costs.

Figure 3:
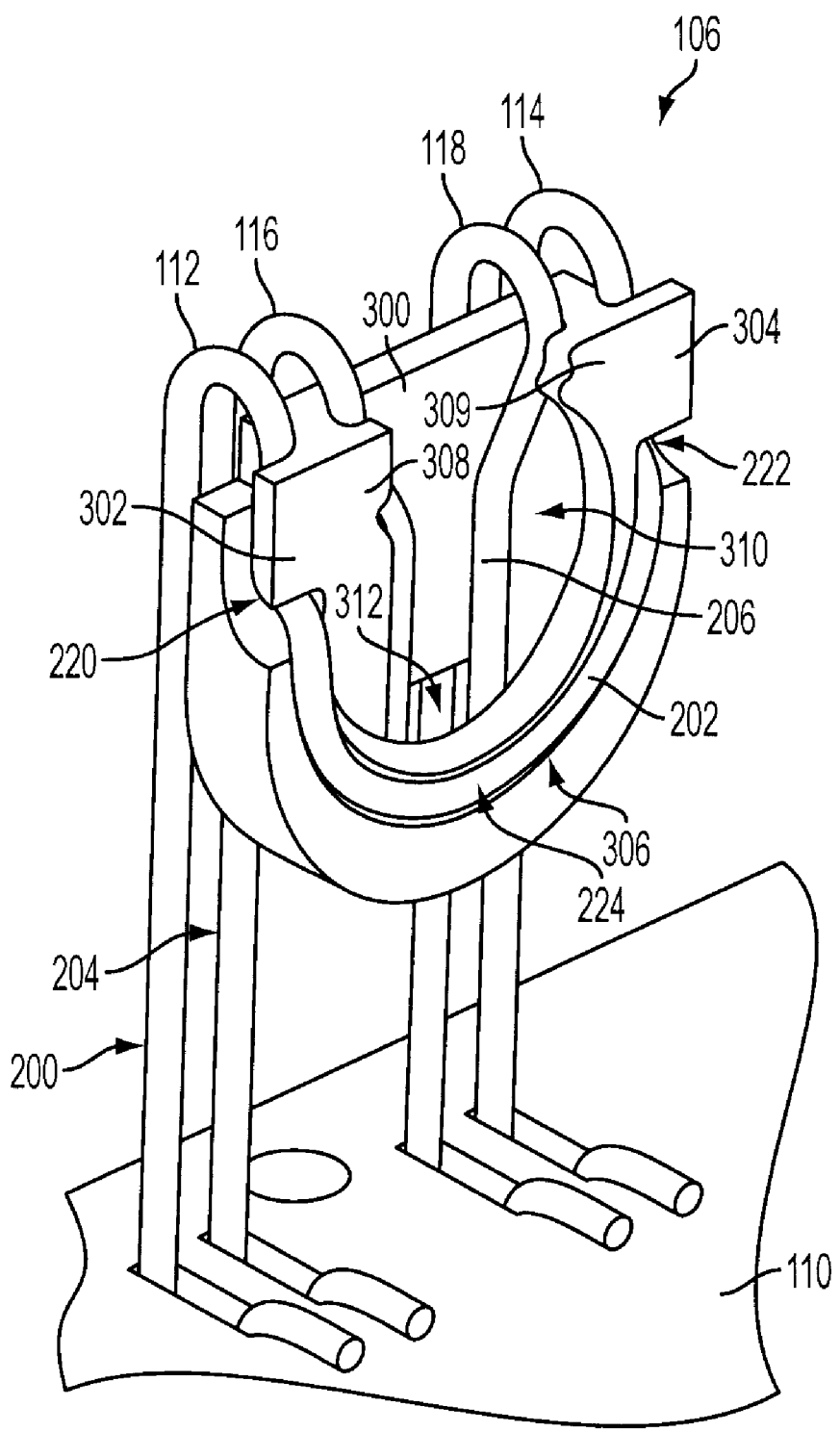
FIG. 3 shows a front view of a spring dual-contact assembly of the embodiment of FIG. 1.
Figure 4:
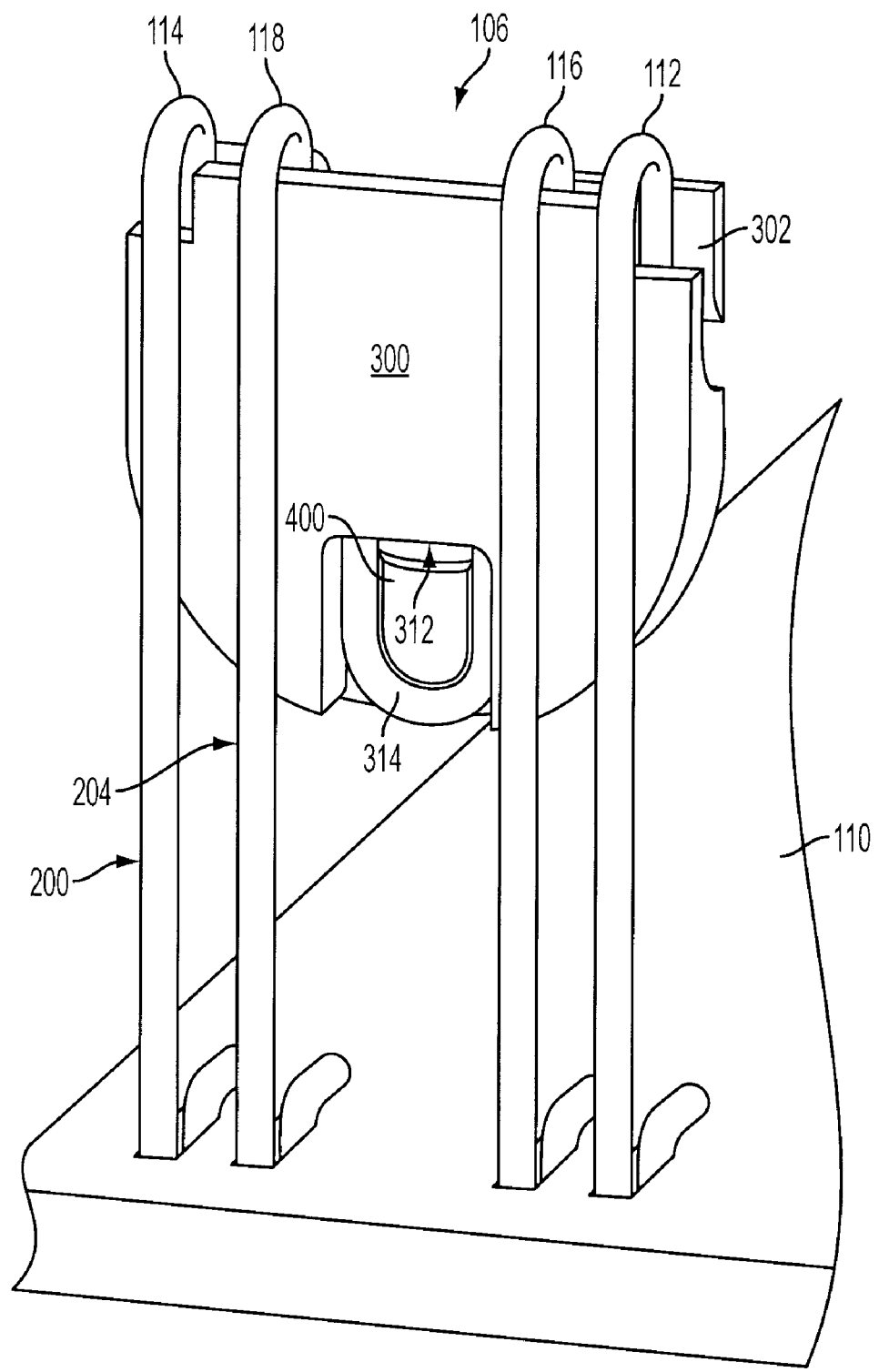
FIG. 4 shows a rear view of a spring dual-contact assembly of the embodiment of FIG. 1.

FIGS. 3 and 4 show the spring dual-contact assembly 106 in more detail. As mentioned above, the positive contact 206 and the negative contact 202 are separated by an insulator 300 to which both contacts are connected. The insulator 300 is configured to hold the positive contact 206 and the negative contact 202 in a fixed relation to one another to prevent the positive contact 206 and negative contact 202 from touching. Further, these figures show the various structures on the insulator 300 that enable the outer wire 200 and inner wire 204 to be snapped onto the insulator 300. These structures may be collectively referred to as a "mechanical retention interface." First regarding the outer wire 200, the insulator 300 comprises protrusions 302 and 304 on each side of the insulator between which the outer wire fits adjacent to bends 220, 222. The outer wire 200 may be snapped into these protrusions simply by pulling the sides of the outer wire 200 sufficiently far apart to fit the insulator 300 between the sides of the outer wire 200, and then releasing the outer wire to allow the sides of the wire to snap into location in the protrusions 302 and 304. The insulator 300 further comprises an inner edge 306 configured to fit the curvature of the bend 224 that forms the negative contact 202. It should be understood that additional features, including but not limited to retaining features described below with reference to FIGS. 5-7, may also be utilized to provide additional robustness to the mechanical retention interface.

The mechanical retention interface of the insulator 300 also comprises an inner pair of protrusions 308, 309 configured to engage the inner wire 204. The inner wire 204 may be joined to protrusions 308, 309 simply by squeezing the sides of the inner wire 204 together, inserting the inner wire into the appropriate location within the insulator 300, and then releasing the sides of the inner wire 204 to allow the inner wire to snap into place beneath the protrusions 308, 309.

The mechanical retention interface of the insulator 300 may comprise additional structures to enable the secure connection of the insulator 300 to the outer wire 200 and inner wire 204. Referring first to FIG. 3, the insulator 300 comprises a recess 310 in which the positive contact 206 is located. The recess 310 comprises an opening 312 formed in a side of the recess into which a contact retaining portion 314 in the form of a distal loop of the inner wire 204 extends. Referring next to FIG. 4, the insulator 300 comprises a retention feature 400 around which the retaining portion 314 of the inner wire 204 extends. The retention feature 400 in the depicted embodiment comprises a raised portion of the insulator with a shaped perimeter in which the retaining portion 314 of the positive contact 206 is seated. The retaining portion 314 of the positive contact may be connected to the retention feature 400 simply by inserting the retaining portion 314 sufficiently far into the opening 312 such that the retaining portion 314 loops around and snaps over the retention feature 400. It should be understood that the depicted retention schemes are shown for the purpose of example, and that any other suitable retention scheme may be used without departing from the scope of the present disclosure.

The combination of each of the above-described structures of the mechanical retention interface of the spring dual-contact assembly 106 helps to hold the insulator 300 firmly in place on the negative contact 202 and positive contact 206 in a low cost, easy-to-assemble manner. Further, precision plastic structures may be easier to manufacture with stricter tolerances than metal wire bends. Therefore, the mechanical retention interface structures on the insulator 300 may be designed to accept wire configurations within a relatively broad tolerance range. This also may help to simplify manufacturing by enabling the use of lower-precision bending processes to form outer wire 200 and inner wire 204.

Figure 5:
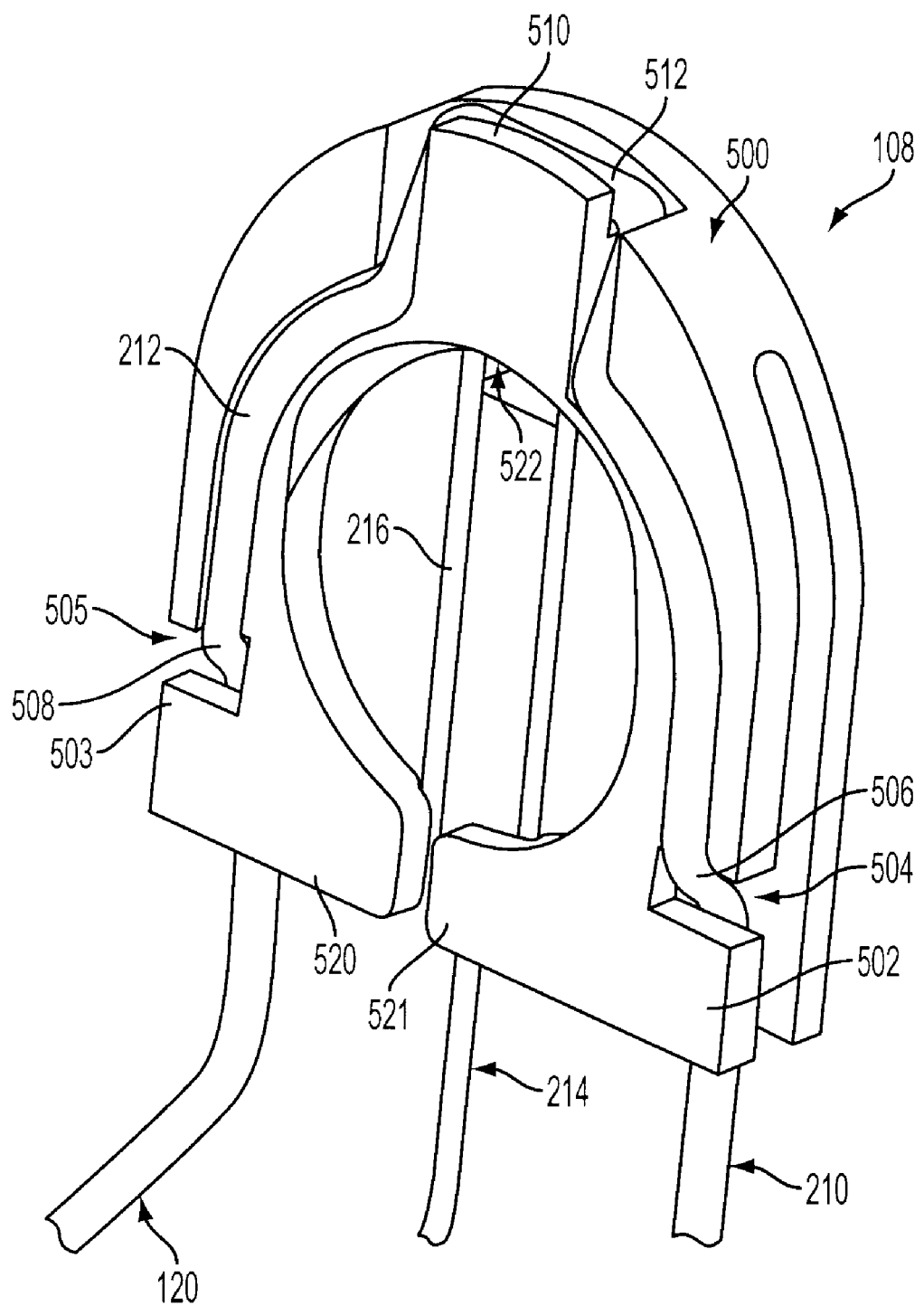
FIG. 5 shows a front view of a non-spring dual-contact assembly of the embodiment of FIG. 1.
Figure 6:
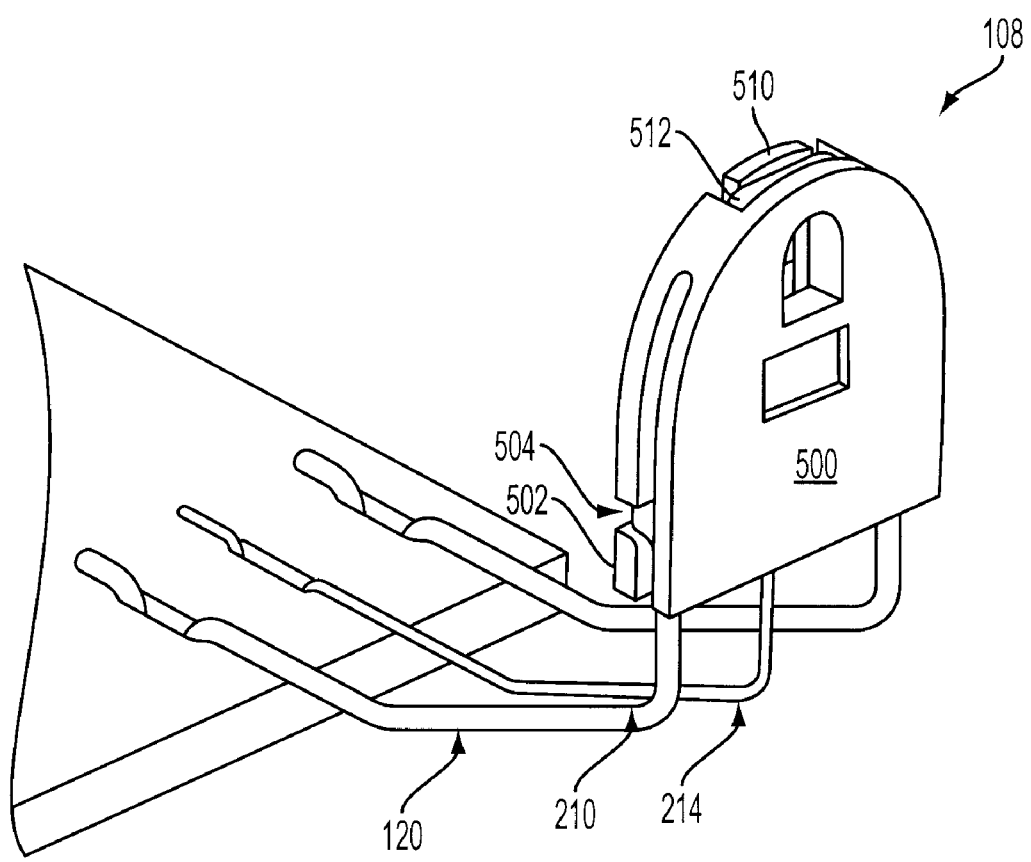
FIG. 6 shows a rear view of a non-spring dual-contact assembly of the embodiment of FIG. 1.

Next, FIGS. 5 and 6 show the non-spring dual-contact assembly 108 in detail. As with the spring dual-contact assembly 106, the non-spring dual-contact assembly comprises an insulator 500 that separates the positive contact 216 and the negative contact 212 and holds the two contacts in a fixed position to one another. Further, the insulator 500 also comprises a mechanical retention interface having structures configured to allow the insulator 500 to be attached to the positive contact 216 and the negative contact 212 in a simple, snap-on manner. First regarding the outer wire 210, the insulator 500 comprises protrusions 502, 503 with openings 504, 505 through which the outer wire 210 can be inserted by pulling each side of the outer wire 210 apart, positioning the insulator 500 appropriately, and then releasing the sides of the outer wire 210. This allows the outer wire 210 to snap through the openings 504, 505 and under the protrusions 502, 503. The outer wire 210 comprises s-shape bends 506, 508 that help to hold the outer wire 210 under the protrusions 502, 503 offset the negative contact 212 relative to the positive contact 216 so that the contacts are positioned appropriately for a battery in the battery holder. Further, the insulator 500 also comprises an additional retention feature in the form of a protrusion 510 that engages a retaining feature 512 in the form of a distal loop in the outer wire 210.

In the depicted embodiment, the outer wire 210 is bent out of a plane of the negative contact 212 to engage the protrusions 502, 503 and 510, and therefore does not contact a battery at the protrusion locations. However, due to the relatively small number of and size of protrusions, a relatively large contact area exists between the negative contact 212 and a battery positioned in the battery holder, helping to ensure good electrical contact between the battery and the negative contact 212.

Continuing with FIGS. 5 and 6, the insulator 500 also comprises a pair of inner protrusions 520, 521 behind which the sides of the positive contact 216 are held. The positive contact may be installed behind protrusions 520, 521 by squeezing the sides of the positive contact 216 together, positioning the positive contact 216 appropriately relative to the insulator 500, and then releasing the sides of the positive contact to allow the positive contact to snap beneath the protrusions 520, 521. Further, the insulator 500 also comprises an opening, the location of which is indicated at 522, within which a loop of the positive contact 216 extends to secure the positive contact 216 to the insulator. In some embodiments, a retention feature, such as that shown at 400 in FIG. 4, may be located in the opening 522, while other embodiments may omit such a feature.

The combination of each of the above-described structures of the mechanical retention interface of the non-spring dual-contact assembly 108 enables the simple, snap-together assembly of the dual-contact assembly 108. Further, because precision plastic structures may be easier to manufacture than precision metal wire bends, the mechanical retention interface structures on the insulator 500 may be designed to accept wire configurations within a relatively broad tolerance range. This may allow the use of lower-precision bending processes to form outer wire 210 and inner wire 214, adding to cost savings.

Figure 7:
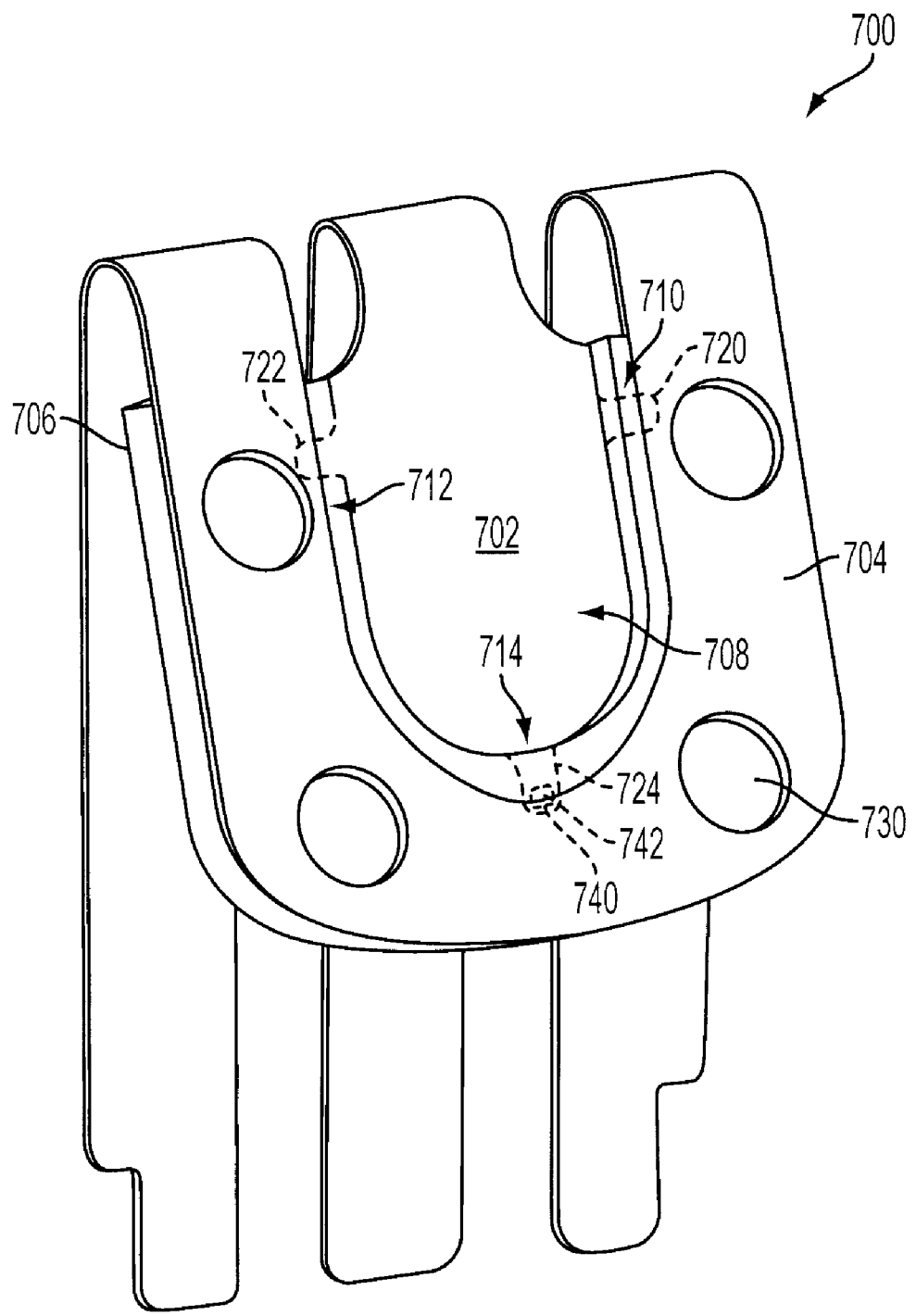
FIG. 7 shows a front view of another embodiment of a spring dual-contact assembly according to the present disclosure.

FIG. 7 shows another embodiment of a spring dual-contact assembly 700. Instead of wire contacts, spring dual-contact assembly 700 comprises a generally flat positive contact 702 and a generally flat negative contact 704 fabricated from stamped metal or the like. Spring force is provided via bends in the metal pieces that form the positive contact 702 and the negative contact 704. Spring dual-contact assembly 700 also comprises an insulator 706 disposed between the positive contact 702 and the negative contact 704. The insulator 706 comprises a recess 708 that accommodates the positive contact 702 and that helps to provide a desired offset between the positive contact 702 and the negative contact 704. Further, the insulator 706 may also comprise one or more openings formed in a side of the recess 708. Three openings 710, 712, 714 are shown in the depicted embodiment, but it will be understood that any suitable number of openings may be provided. The openings 710, 712, 714 accommodate three complementary retaining portions 720, 722, 724, such as tongues, tabs, rods, pins, or any other suitable structure, that extend from an edge of the positive contact 702 to hold the positive contact 702 within the recess 708. This allows the positive contact to be installed in the recess 708 by snapping the positive contact 702 into the openings 710, 712, 714, and thereby may help to avoid additional manufacturing steps such as heat staking, bending metal wings on the positive contact around protrusions on the insulator, etc. While the negative contact 704 is shown as being held to the insulator via heat stakes 730, it will be understood that similar snap-in features may also be provided for the negative contact 704 by appropriate design of the negative contact 704 and the insulator 706. In the depicted embodiment, each retaining portion is disposed on a different side of the positive contact 702. However, it will be appreciated that the retaining portions may have any other suitable configuration. Further, in yet other embodiments, the insulator 706 may comprise protrusions configured to extend into openings on the positive contact 702 and the negative contact 704 in a manner similar to that described above.

In some embodiments, one or more retaining portions 720, 722, 724 of the positive contact 702 may comprise an opening 740 configured to engage a retention member 742 disposed within the appropriate opening 710, 712, 714. This may help to increase the robustness of the connection of the positive contact 702 of the insulator 706. Further, in some embodiments in which a more robust connection is required, the retaining portion/opening configuration shown in FIG. 7 may be used in combination with one or more heat stakes (not shown) to hold the positive contact firmly to the insulator 706. In such an embodiment, the retaining portion/opening configuration may provide additional robustness to the design relative to the use of heat stakes alone.

Figure 8:
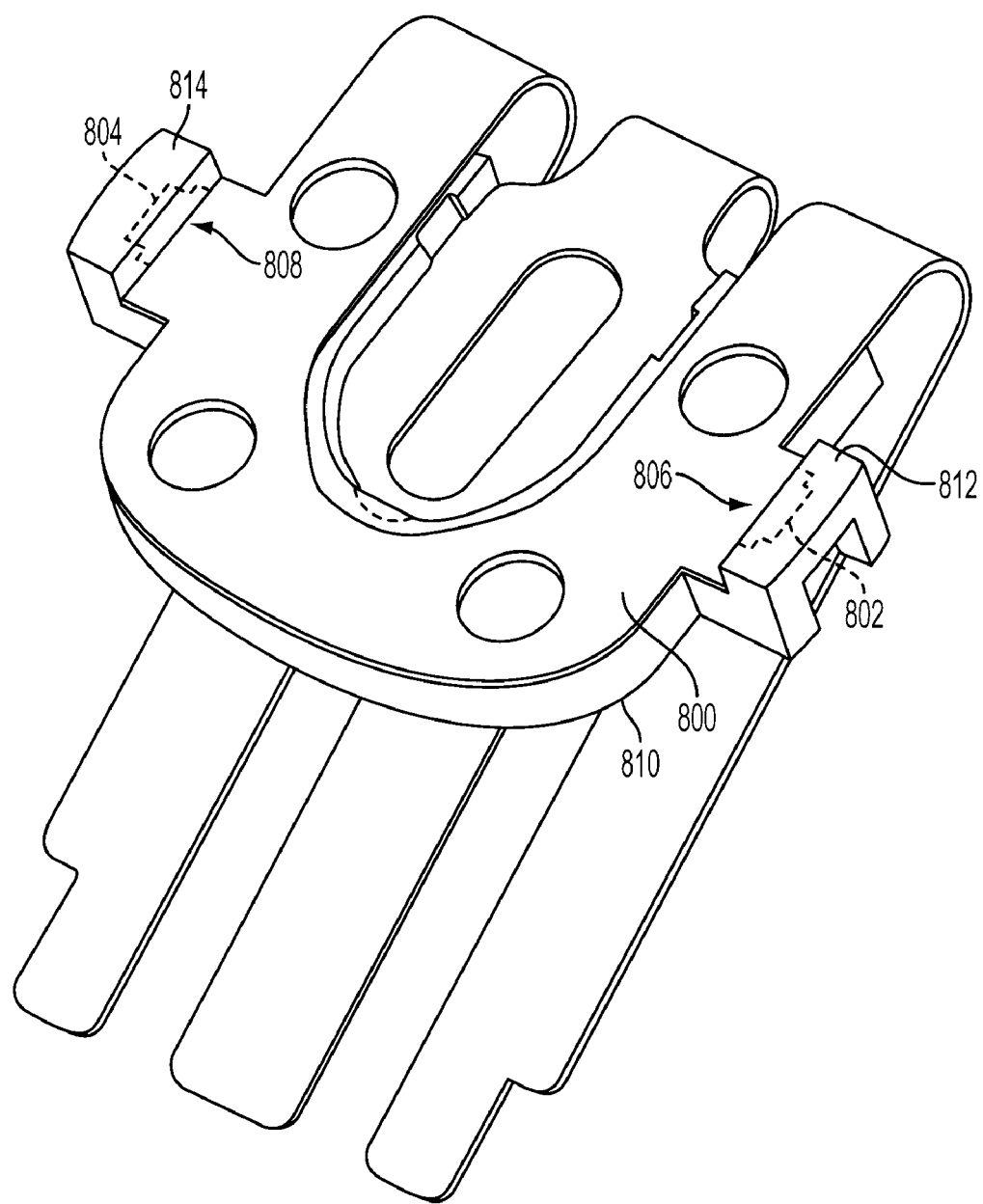
FIG. 8 shows a front view of another embodiment of a spring dual-contact assembly according to the present disclosure.

Further, as shown in FIG. 8, a negative contact 800 may also comprise retaining portions 802, 804 configured to extend into openings 806, 808 on an insulator 810. In the depicted embodiment, the insulator 810 comprises extensions 812, 814 that extend beyond and over retaining portions 802, 804 to accommodate the retaining portions 802, 804. However, it will be appreciated that the insulator 810 may comprise any other suitable structure to accommodate the retaining portions 802, 804. Further, while two retaining portions 802, 804 are depicted as being located on side portions of the negative contact 800, it will be appreciated that any suitable number of retaining portions may be located at any suitable place on the negative contact.

Figure 9:
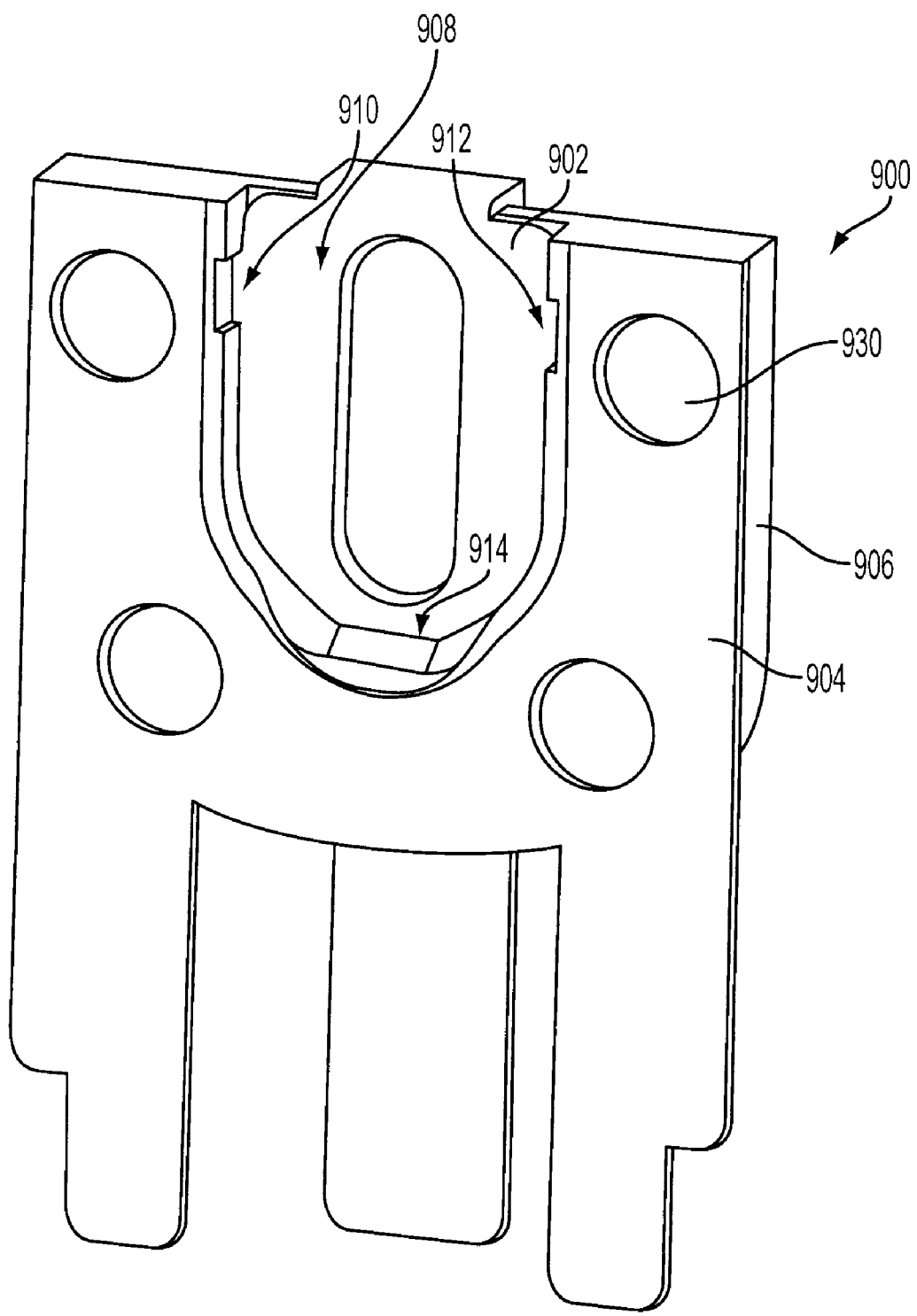
FIG. 9 shows another embodiment of a non-spring dual-contact assembly according to the present disclosure.

Continuing with the Figures, FIG. 9 shows an embodiment of a non-spring dual-contact assembly 900 with a generally flat positive contact 902 and a generally flat negative contact 904. As described above, the positive contact 902 and negative contact 904 may each be made from a material such as stamped metal. Non-spring dual-contact assembly 900 also comprises an insulator 906 disposed between the positive contact 902 and the negative contact 904. As opposed to the embodiments of FIGS. 7 and 8, the non-spring dual-contact assembly 900 has no spring-force-providing bends in the positive contact 902 and the negative contact 904. The insulator 906 comprises a recess 908 that accommodates the positive contact 902 and that helps to provide a desired offset between the positive contact 902 and the negative contact 904.

Further, the insulator 906 also comprises one or more openings formed in a side of the recess 908. Three openings 910, 912, 914 are shown in the depicted embodiment, but it will be understood that any suitable number of openings may be provided. The openings 910, 912, 914 accommodate three complementary retaining portions such as tongues, tabs, rods, pins, or any other suitable structure, that extend from an edge of the positive contact 902 to hold the positive contact 902 within the recess 908. This allows the positive contact to be installed in the recess 908 by snapping the positive contact 902 into the openings 910, 912, 914, and thereby may help to avoid additional manufacturing steps such as heat staking, bending metal wings on the positive contact around protrusions on the insulator, etc. While the negative contact 904 is shown as being held to the insulator via heat stakes 930, it will be understood that similar snap-in features may also be provided for the negative contact 904 by appropriate design of the negative contact 904 and the insulator 906. In the depicted embodiment, each retaining portion is disposed on a different side of the positive contact 902. However, it will be appreciated that the retaining portions may have any other suitable configuration.

Various embodiments described herein comprise one spring dual-contact assembly and one non-spring dual contact assembly. However, other embodiments of battery holders may comprise two spring dual-contact assemblies, or two non-spring dual-contact assemblies. For example, with reference to FIG. 1, an embodiment with two spring dual-contact assemblies may have a spring dual-contact assembly 106 substituted for non-spring dual-contact assembly 108 so that the battery holder has face-to-face spring dual-contact assemblies 106. Likewise, the embodiments of FIG. 7 or 8 could be utilized in a battery holder with two spring dual-contact assemblies.

Figure 10:
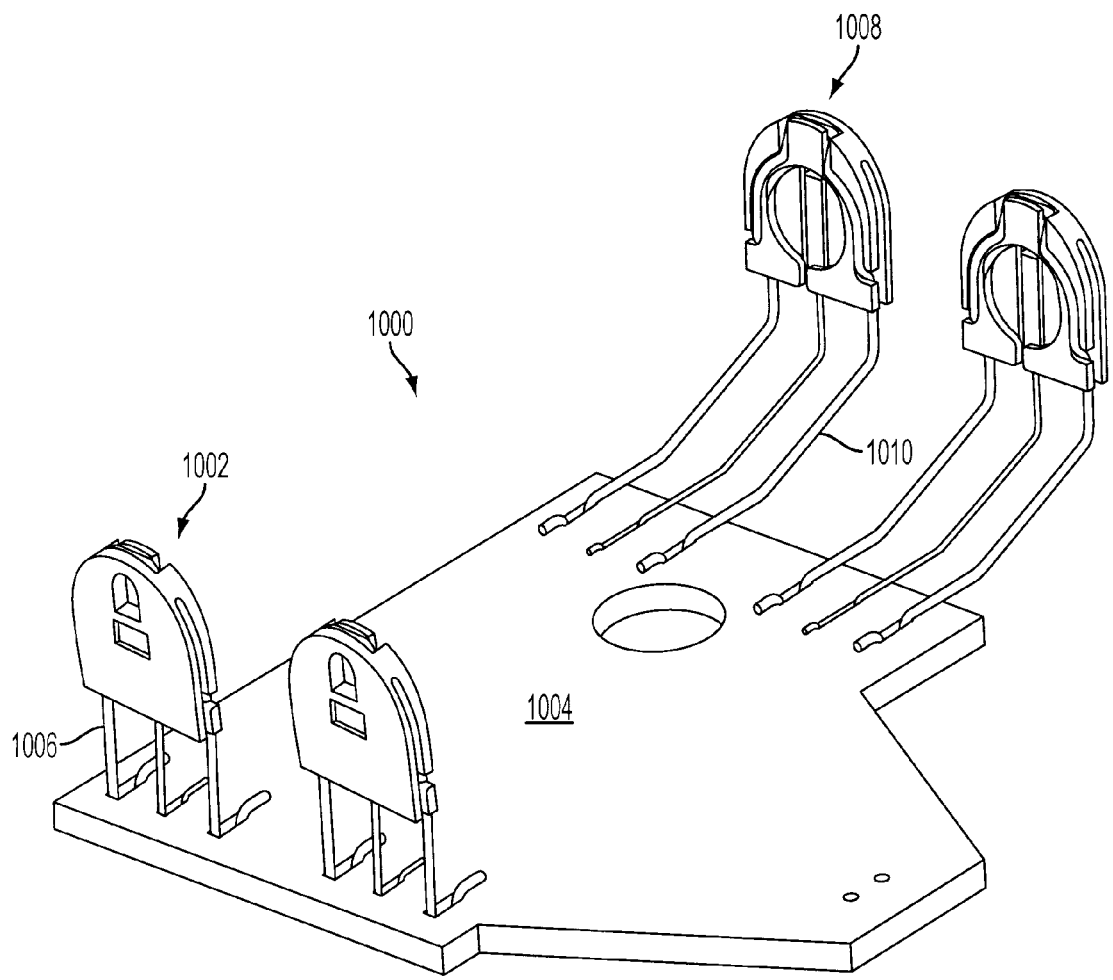
FIG. 10 shows an embodiment of side-by-side battery holders each comprising two non-spring dual-contact assemblies.

A battery holder may also comprise two non-spring dual-contact assemblies. FIG. 10 shows an example of a battery holder 1000 that comprises two non-spring dual contact assemblies. In this embodiment, one non-spring dual-contact assembly 1002 comprises a wire contact assembly that is coupled to a substrate 1004 with relatively short wire sections 1006, while another non-spring dual-contact assembly 1008 comprises a wire contact assembly that is coupled to the substrate 1004 with elongate, angled wire section 1010. This may allow the size of the substrate to be reduced relative to the use of two non-spring dual-contact assemblies 1002 with shorter connections to the substrate 1004. In other embodiments, each contact has similar connections to the substrate 1004, either shorter or longer. It will be appreciated that the specific configuration of the embodiment of FIG. 10 is shown for the purpose of example, and is not intended to be limiting in any manner.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A battery holder, comprising:
   a substrate; and
   a spring dual-contact assembly coupled to the substrate, the spring dual-contact assembly comprising:
      a positive contact configured to contact a positive terminal of a battery positioned in the battery holder with the positive terminal oriented toward the spring dual-contact assembly;
      a negative contact configured to contact a negative terminal of a battery positioned in the battery holder with the negative terminal oriented toward the spring dual-contact assembly;
      an insulator coupled to the positive contact and the negative contact and configured to hold the positive contact and the negative contact in a fixed relation to one another; and
      one or more cantilever wire springs that holds the negative contact, the positive contact and the insulator in a resiliently displaceable relationship to the substrate.

2. The battery holder of claim 1, further comprising a plurality of cantilever wire springs, and wherein each cantilever spring is formed from a continuous wire that also forms one of the positive contact and the negative contact.

3. The battery holder of claim 1, wherein the negative contact comprises a wire contact.

4. The battery holder of claim 3, wherein the negative contact interfaces with a mechanical retention interface on the insulator via an offsetting wire bend.

5. The battery holder of claim 4, wherein the mechanical retention interface on the insulator comprises one or more protrusions configured to extend over the negative contact adjacent to the offsetting wire bend.

6. The battery holder of claim 1, wherein the positive contact is a wire contact and comprises a retaining portion that extends through an opening in the insulator and engages a retention feature on the insulator.

7. The battery holder of claim 1, further comprising a non-spring dual-contact assembly, and wherein one or more of the spring dual-contact assembly and the non-spring dual-contact assembly comprises an elongate, angled wire section connected to the substrate.

8. The battery holder of claim 7, wherein the non-spring dual-contact assembly comprises positive and negative wire contacts.

9. A battery holder having a dual-contact assembly, the dual-contact assembly comprising:
   a generally flat positive contact;
   a generally flat negative contact;
   a contact retaining portion that extends from a side of one of the positive contact and the negative contact; and an insulator disposed between the positive contact and the negative contact and comprising an opening into which the retaining portion extends.

10. The battery holder of claim 9, wherein the retaining portion extends from a side of the positive contact, wherein the insulator comprises a recess in which the positive contact is disposed, and wherein the recess comprises an opening formed in the side thereof into which the retaining portion extends.

11. The battery holder of claim 10, wherein the positive contact comprises a plurality of retaining portions extending from a battery-contacting surface in a plane of the battery contact surface, and wherein the insulator comprises a plurality of openings into which the plurality of retaining portions extend.

12. The dual-battery holder of claim 9, wherein the retaining portion extends from a side of the negative contact.

13. The battery holder of claim 9, wherein the retaining portion comprises an opening configured to engage a retention feature on the insulator.

* * * * *